United States Patent
Wu et al.

(10) Patent No.: US 6,646,412 B2
(45) Date of Patent: Nov. 11, 2003

(54) METHOD AND SYSTEM FOR CONTROLLING TORQUE IN A POWERTRAIN THAT INCLUDES AN INDUCTION MOTOR

(75) Inventors: Bo Wu, Northville, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 105 days.

(21) Appl. No.: 10/073,476

(22) Filed: Feb. 11, 2002

(65) Prior Publication Data

US 2003/0151385 A1 Aug. 14, 2003

(51) Int. Cl.[7] .............................................. H02P 5/408
(52) U.S. Cl. ....................... 318/801; 318/811; 318/812
(58) Field of Search ................................ 318/727, 767, 318/798–803, 805, 807, 808, 811, 812

(56) References Cited

U.S. PATENT DOCUMENTS

| | | | | |
|---|---|---|---|---|
| 4,967,135 A | * | 10/1990 | Ashikaga et al. | 318/808 |
| 5,032,771 A | * | 7/1991 | Kerkman et al. | 318/52 |
| 5,334,923 A | * | 8/1994 | Lorenz et al. | 318/805 |
| 5,883,344 A | | 3/1999 | Colby et al. | |
| 5,965,995 A | | 10/1999 | Seibel et al. | |
| 6,014,006 A | | 1/2000 | Stuntz et al. | |
| 6,286,473 B1 | | 9/2001 | Zaremba | |
| 6,300,741 B1 | * | 10/2001 | Okuyama | 318/799 |
| 6,335,605 B1 | * | 1/2002 | Negoro | 318/727 |
| 6,448,735 B1 | * | 9/2002 | Gokhale et al. | 318/700 |
| 6,566,840 B1 | * | 5/2003 | Wu et al. | 318/727 |

* cited by examiner

*Primary Examiner*—Bentsu Ro
(74) *Attorney, Agent, or Firm*—Brooks & Kushman; Carlos L. Hanze

(57) ABSTRACT

A method and system for estimating slip gain for use in the control of torque in a multi-phase induction machine. The slip gain estimate is based on a transient response of the induction machine to torque command changes. The invention is independent of machine parameters other than the slip gain. The method uses a slip gain estimation algorithm that is suited for use either as a self-calibration procedure or a background procedure that continually updates the slip gain during normal operation of the induction machine. The estimation method of the invention is suited for automotive driveline applications, which typically have limited sensor capability and which may present tuning problems associated with high volume production and with slip gain estimates when temperature changes during normal operation.

10 Claims, 16 Drawing Sheets

$(K_p = 0$ & $K_i = .0001)$ $(K_p = 0$ & $K_i = .0002)$ ($K_p = 0$ & $K_i = .0005$)

METHOD AND SYSTEM FOR CONTROLLING TORQUE IN A POWERTRAIN THAT INCLUDES AN INDUCTION MOTOR

BACKGROUND OF THE INVENTION

1. Field of the Invention

The invention relates to a method for controlling torque in a powertrain that includes an induction motor.

2. Background Art

Electric machines for use in automotive vehicle drivelines have been developed in recent years for use in hybrid electric vehicles, fuel cell vehicles, integrated starter/generator systems, and electric power-assisted steering systems. These design efforts relate principally to drivelines characterized by increased fuel economy, reduced engine exhaust emissions, and an ability to accommodate increased vehicle electrical loads.

These drivelines make use of multi-phase induction machines. This is due to the rugged nature and the low cost of induction machines, which make them feasible for automotive applications. Induction machines have advantages also for industrial applications other than automotive applications.

An automotive vehicle driveline that would include an electric machine requires the electric machine to be capable of operating with variable torque control over a wide speed range. A current state of the art design approach for drivelines that include electric machines is referred to as "field orientation" or "vector control".

There are several known methods for implementing field-oriented torque control of an induction machine drive. The simplest and most often-used form is based on the slip/frequency relationship of the induction machine. This is called "indirect field orientation" (IFO). An example of a control technique using IFO control methods is disclosed in co-pending patent application Ser. No. 10/060,434, filed Jan. 30, 2002, entitled "Method for Controlling Torque in a Rotational Sensorless Induction Motor Control System with Speed and Rotor Flux Estimation", filed by Alexander T. Zaremba et al. That co-pending application is assigned to the assignee of the present invention.

A key feature of the IFO technique is its dependency on only two parameters of the induction machine; i.e., the slip gain and the torque gain. The slip gain is of special interest since its value directly affects the dynamics of the torque response, whereas the torque gain, if the controller is mistuned, would result only in a scaling of the resultant torque produced.

Because of the relationship between the dynamics of the torque controller and the tuning of the slip gain estimate, there is a need in drives that include an induction machine for tuning of the slip gain estimate during a calibration sequence or during the normal operation of the system. Furthermore, it is desirable to develop a tuning method that does not depend on other machine or system parameters, and which is capable of performing the tuning without requiring measurement of the torque being produced. This is of importance in automotive applications where high volume production would not permit individual testing of the electric machines for the purpose of tuning the controller for machine-to-machine variations in parameters.

SUMMARY OF THE INVENTION

The invention comprises a method and system for estimating the slip gain (or the rotor time constant) of an induction machine based upon its transient response to a change in an input torque command. The "slip gain" is obtained by computing the inverse of the rotor time constant. The slip is the excitation frequency of the stator flux with respect to the rotor speed. The difference between the two is equal to the slip.

Unlike certain known control systems that determine slip gain based on steady state behavior, the slip gain estimate of the present invention is based on the transient response of a commanded rotor flux reference frame stator voltage following a command for a change in torque. The method of the invention will determine the transient response of the stator voltage in an indirect field oriented induction machine drive. If the slip gain estimate is incorrectly tuned, the results of the slip gain estimate calculation will be compared to the transient response of the stator voltage when the slip gain estimate is correctly tuned. The difference between the stator voltages corresponding to an incorrectly tuned system and a correctly tuned system will be determined, and the slip gain estimate will be corrected based upon the magnitude of the difference.

This control is achieved without reliance on any other machine or system parameters, and it does not require torque measurements. It requires only a current sensor and a rotor position sensor, which normally are included in an electric machine drive. The method of the invention can be used during normal operation of the drive with the tuning function in the background or during a calibration sequence before the drive is used in a finished product.

In practicing the invention, the induction machine drive would have a rotor and a fixed stator that forms a torque flow path from a torque input to a torque output. The method of the invention comprises the steps of commanding a change in torque at the torque input, determining commanded q-axis and d-axis stator voltages, calculating the product of the stator voltage and a desired windowing function. The windowing function is used as a multiplier for stator voltage data following a change in a torque command to effect a correctly tuned slip gain estimate.

Parameters, called q and d factors, are calculated for a current transient event as a time integral of a windowed q and d axis stator voltage waveform. Using the q and d factors, a determination is made with respect to whether the estimate of slip gain is accurate. The slip gain estimate then is corrected for a given change in commanded torque, if necessary, based on the q and d factors relative to a slip gain estimate for a correctly tuned drive.

In another aspect of the invention, a system is provided for controlling torque which establishes a stator current in the rotor flux frame following a change in commanded input torque. The difference between stator current in the rotor flux frame and a commanded input stator current in the rotor flux frame are used with estimated rotor flux to develop a commanded stator voltage in the rotor flux reference plane.

BRIEF DESCRIPTION OF THE DRAWINGS

FIGS. 3c and 3d are graphs corresponding to FIGS. 3a and 3b when the machine is operating in the motoring mode, FIG. 3c showing the slip gain estimate 20% high and FIG. 3d showing a slip gain estimate 20% low;

FIGS. 10c and 10d show the q-factor and d-factor of the induction machine during motoring operation;

DETAILED DESCRIPTION OF AN EMBODIMENT OF THE INVENTION

Figure 1:
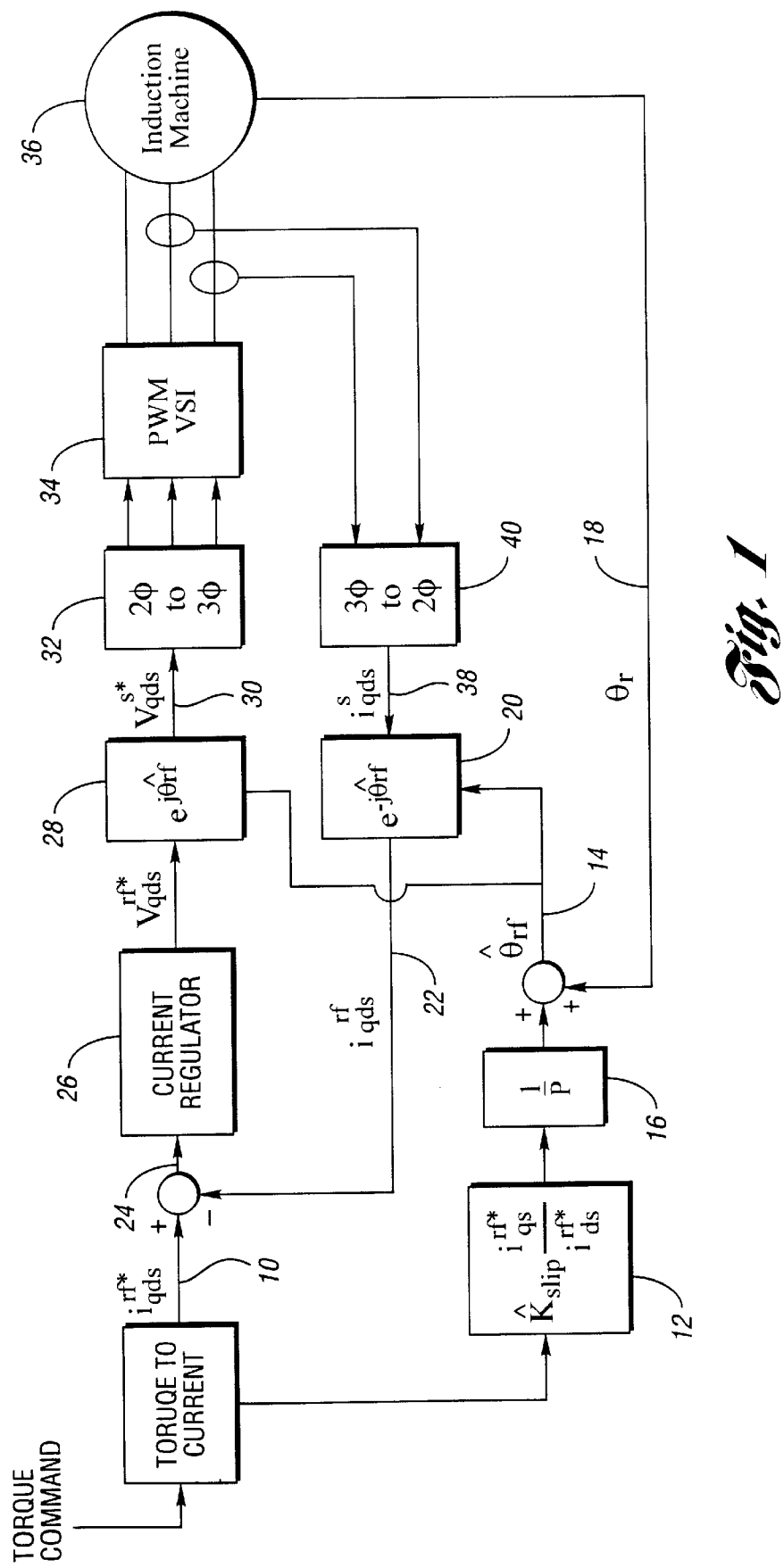
FIG. 1 is a block diagram of an indirect field oriented torque control induction machine drive.

For the purpose of understanding the transient response of the stator voltage that is characteristic of the method of the invention, a steady state or approximation for the flux dynamics will be described. This involves a description of a complex vector model for the electrical dynamics of an induction machine using dq notation in a stationary reference frame, as shown in the following equations.

$$v_{qds}^s = r_s i_{qds}^s + p\lambda_{qds}^s \quad \text{(stator voltage equation) (1)}$$

$$0 = r_r i_{qdr}^s + (p - j\omega_r)\lambda_{qdr}^s \quad \text{(rotor voltage equation) (2)}$$

$$\lambda_{qds}^s = L_s i_{qds}^s + L_m i_{qdr}^s \quad \text{(stator flux linkage equation) (3)}$$

$$\lambda_{qdr}^s = L_m i_{qds}^s + L_r i_{qdr}^s \quad \text{(rotor flux linkage equation), (4)}$$

where p is the differential operator (nominally equivalent to the Laplace variable, s) and $$f_{qds} = f_{qs} - j f_{ds} \quad \text{(complex vector notation)(5)}$$

One of the simplest ways to achieve high-performance torque control of an induction machine is by using the concept of field oriented control. The goal of field orientation is to control independently both the amount of flux and the torque produced in a machine. This independent control is achieved by orienting the stator currents in a machine relative to one of the various machine fluxes, usually the rotor flux.

Transforming (1)–(4) to a reference frame aligned with the rotor flux ($\lambda_{qr}^{rf}=0$) results in the following equations, which model the machine's behavior:

$$v_{qds}^{rf} = r_s i_{qds}^{rf} + (p + j\omega_e)\lambda_{qds}^{rf} \quad \text{(stator voltage equation) (6)}$$

$$0 = r_r i_{qdr}^{rf} + [p - j(\omega_r - \omega_e)]\lambda_{qdr}^{rf} \quad \text{(rotor voltage equation) (7)}$$

$$\lambda_{qds}^{rf} = L_s i_{qds}^{rf} + L_m i_{qdr}^{rf} \quad \text{(stator flux linkage equation) (8)}$$

$$-j\lambda_{dr}^{rf} = L_m i_{qds}^{rf} + L_r i_{qdr}^{rf} \quad \text{(rotor flux linkage equation) (9)}$$

Since the rotor flux is aligned along the d-axis in this reference frame, the rotor flux linkage equation, (9), can be used to solve for a relationship between the q-axis stator and rotor currents, (10), and a simplified rotor flux linkage equation, (11).

$$i_{qr}^{rf} = -\frac{L_m}{L_r} i_{qs}^{rf} \quad (10)$$

$$\lambda_{dr}^{rf} = L_m i_{ds}^{rf} + L_r i_{dr}^{rf} = \frac{L_m}{\left(\frac{L_r}{r_r}p + 1\right)} = i_{ds}^{rf} \text{ (rotor flux equation)} \quad (11)$$

The torque produced by an induction machine can be calculated as shown in (12), which is simplified from a general torque equation by the fact that it is calculated using rotor flux reference frame quantities; i.e.:

$$T = \frac{3}{2}\frac{P}{2}\frac{L_m^2}{L_r} i_{qs}^{rf} \lambda_{dr}^{rf} \quad (12)$$

When $i_{ds}^r$ is held constant, (12) can be simplified to the form shown in (13) since $i_{dr}^r$ will be equal to zero; i.e.:

$$T = \frac{3}{2}\frac{P}{2}\frac{L_m}{L_r} i_{qs}^{rf} i_{ds}^{rf} = \frac{1}{K_T} i_{qs}^{rf} i_{ds}^{rf} \quad (13)$$

In (13) a substitution was made for the parameters that scale the product of the q-axis and d-axis currents. This term is often called the torque gain, $K_T$, and is one of the parameters used in field orientation.

Equations (11) and (13) show one of the key advantages of field orientation; namely, its ability to independently control both the torque and the flux level in the machine. This independent control is achieved by using the d-axis stator current, $i_{ds}^r$, to control the flux level and using the q-axis stator current, $i_{qs}^r$, to control the torque level.

Substituting (10) and (11) back into the rotor voltage equation, (7), results in a relationship for the rotor slip frequency; i.e.:

$$s\omega_e = (\omega_e - \omega_r) = \frac{r_r}{L_r} \frac{L_m i_{qs}^{rf}}{\lambda_{dr}^{rf}} \quad (14)$$

When $i_{ds}^r$ is held constant, (14) can be further simplified to the form shown in (15).

$$s\omega_e = (\omega_e - \omega_r) = \frac{r_r}{L_r} \frac{r_r i_{qs}^{rf}}{i_{ds}^{rf}} \quad (15)$$

The slip relationships shown in (14) and (15) form the basis for one of the techniques used to implement a field orientation technique, called indirect field orientation (IFO). In IFO, the slip frequency of a machine is controlled so that it satisfies the relationship shown below in (16) (assuming constant $i_{ds}^r$). If the parameter estimates used in (16) are equal to the actual parameter, then (16) is a necessary and sufficient condition for obtaining the field oriented torque control of an induction machine (where * denotes a commanded value and ^ denotes an estimated value). Thus:

$$s\omega_e^* = \frac{\hat{r}_r}{\hat{L}_r} \frac{i_{qs}^{rf*}}{i_{ds}^{rf*}} = \frac{1}{\hat{\tau}_r} \frac{i_{qs}^{rf*}}{i_{ds}^{rf*}} \quad (16)$$

As can be seen from (16), the slip frequency necessary to obtain field oriented control is a function of the q-axis and d-axis stator currents and the rotor time constant, the inverse of which is commonly called the slip gain. Thus:

$$s\omega_e^* = \hat{K}_{slip} \frac{i_{qs}^{rf*}}{i_{ds}^{rf*}} \quad (17)$$

This slip frequency relationship, (17), can be integrated over time with the results added to the rotor position resulting in an estimate of the rotor flux angle. This calculation forms the basis of IFO and is shown in FIG. 1.

A steady-state approximation has been made for the flux dynamics in the previous equations and the block diagram shown in FIG. 1. This steady-state approximation for the flux dynamics is often made when implementing indirect field orientation, resulting in reduced performance, but the approximation is not required and is only done in this instance to simplify the description and the equations. It does not in any way limit the following description of methods of estimating slip gain.

The torque command in FIG. 1 is transformed to a current in the rotor flux reference frame ($i_{qds}^r$). This is shown at 10 in FIG. 1. At block 12, the estimated slip gain with the q-axis and d-axis current components develop an estimated rotor flux position $\theta_r$ shown at 14. This involves the integration of the slip frequency $S\omega_e$ at the output side of block 12, as shown at 16. The output of block 16 is compared to the measured rotor position $\theta_r$ at 18 and compared to the output of block 16. This is used by the reference frame transformation block 20 to develop a current value in the rotor flux reference frame, as shown at 22.

The values for the current at 10 and at 22 are compared and the result of that comparison is received, as shown at 24, by current regulator 26 to produce a commanded voltage that depends on the current difference. That voltage is transformed at block 28 to produce stationary reference frame stator voltage at 30.

At block 32, the voltage values are transformed from two-phase to three-phase and distributed to voltage source inverter 34, which provides the input to the induction machine 36.

Current from the voltage source inverter is transformed at 40 from three-phase to two-phase.

As shown in the previous derivation, the implementation of IFO in an induction machine drive depends on two machine parameters, the slip gain, $K_{slip}$, and the torque gain, $K_T$. Of these two, slip gain is the more important since it directly affects the dynamics of the torque production, as explained previously.

Many methods have been proposed for estimating the slip gain or rotor time constant of an induction machine, but most of these methods have been based on steady-state behavior of the induction machine drive and a second model for calculating the rotor flux angle, typically using what is termed the voltage model. The dependence of these methods on a second model makes the method sensitive to errors in additional parameters of the machine and places limits on the operating conditions under which parameter estimation can be performed. Other methods also have been developed that use direct torque measurements or special rotor speed trajectories to perform the tuning; but again, these methods have limited usefulness in most applications since they cannot be performed during normal operation of the electric machine drive or because they require special test fixturing and measurement equipment.

The present invention, in contrast, uses an estimation technique that does not have such shortcomings. The slip gain estimate, of course, is an estimate of rotor time constants since one is the inverse of the other.

The field orientation technique of the present invention provides a method for high performance control of the torque produced by the induction machine. It allows the induction machine to be used effectively over its full torque versus speed capability. The field orientation technique, furthermore, decouples the dynamics created by the changes in the flux level from the changes in the torque level. This is characteristic of a transient phenomenon of short duration. It is the key factor in determining the torque control bandwidth of the system.

Almost all of the slip gain or rotor time constant estimation techniques previously developed were based primarily on the steady-state behavior of the induction machine. For the most part, they ignored the information contained in the transient response of the machine to changes in either the torque or flux level when the IFO controller was incorrectly tuned.

Figure 2:
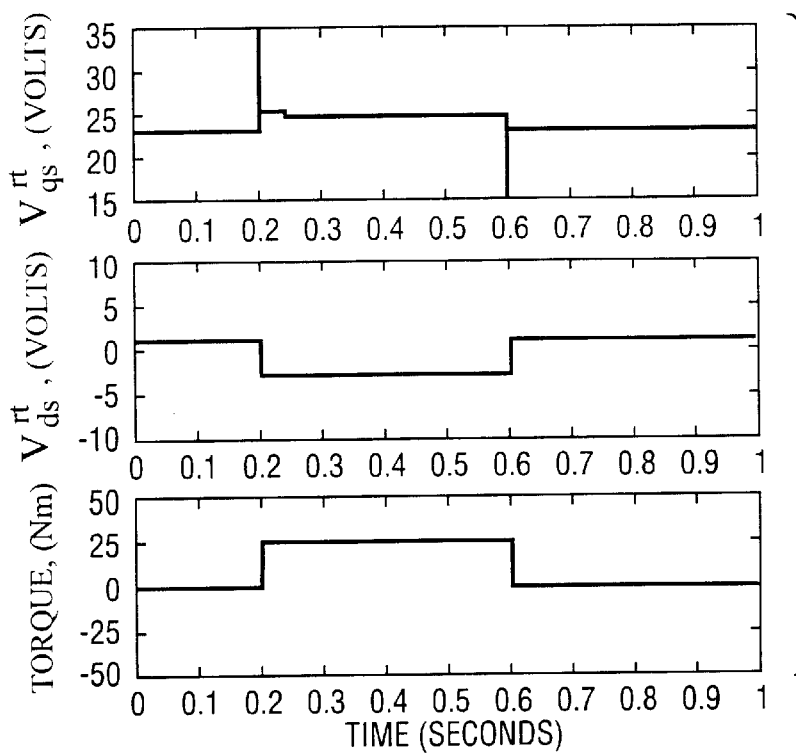
FIG. 2 is a simulated transient response chart showing the stator voltage in an indirect field oriented induction machine drive with the slip gain estimate correctly tuned.
Figure 3A:
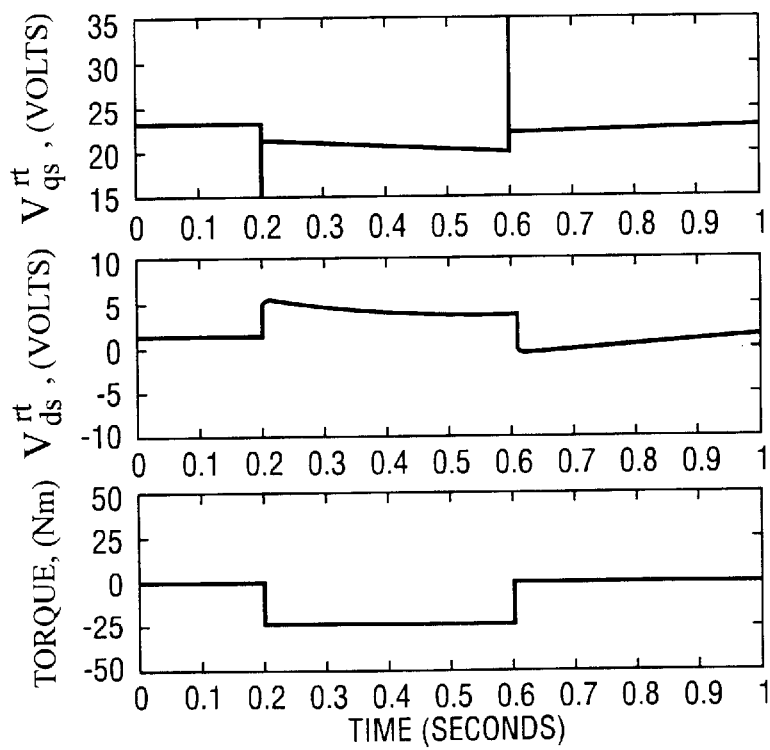
FIGS. 3a and 3b are graphs that show the slip gain estimate when the machine is in a generating mode, the slip gain estimate of FIG. 3a being 20% high and the slip gain estimate for FIG. 3b being 20% low.
Figure 3B:
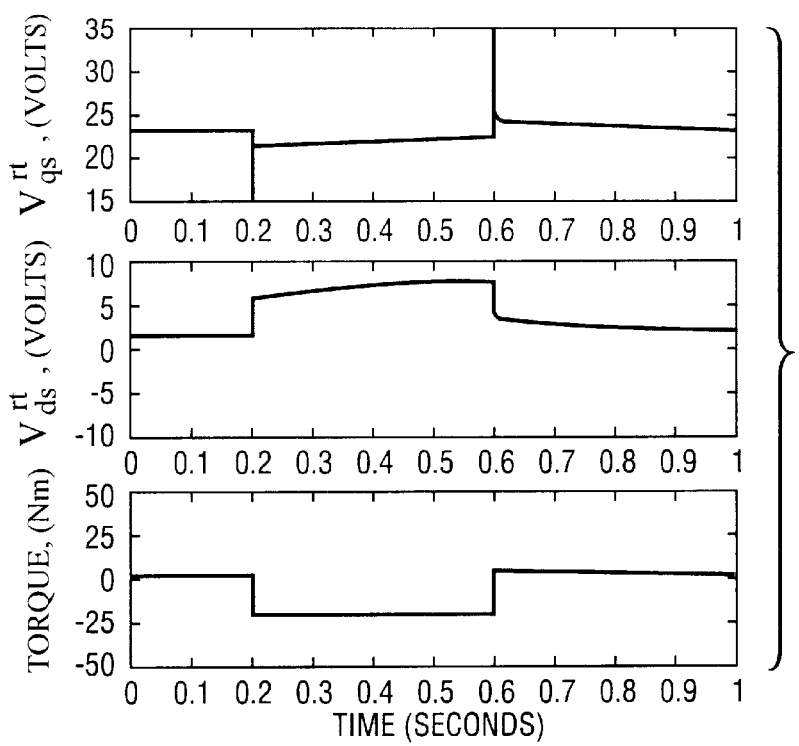
Figure 3C:
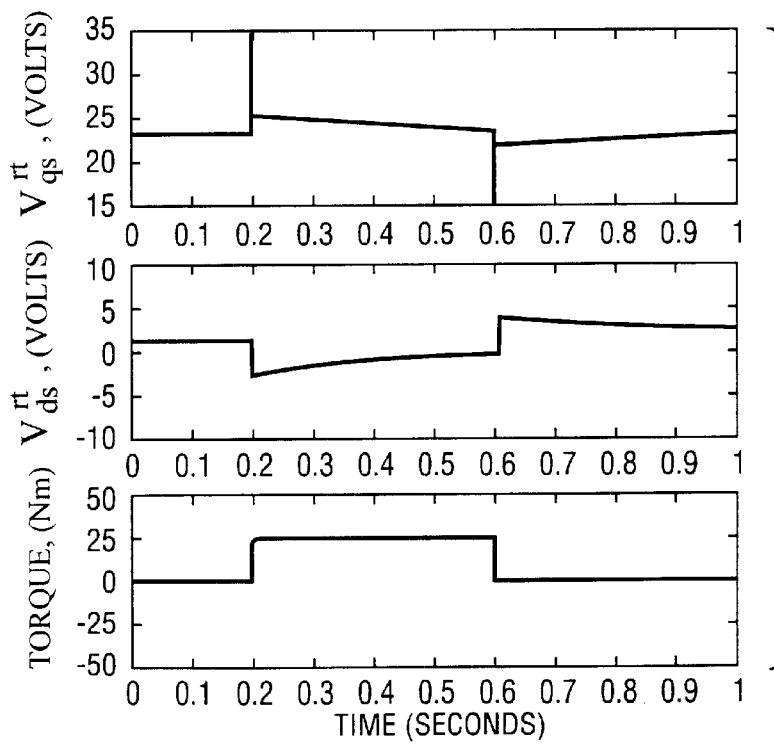
Figure 3B:
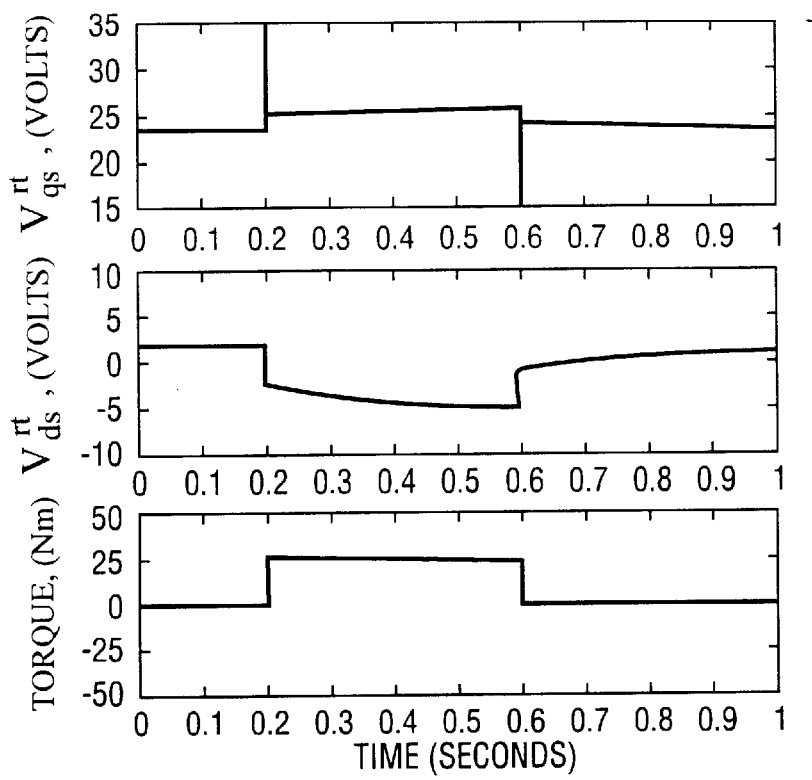

FIG. 2 shows an example of the transient in the stator q-axis and d-axis stator voltages for a step change in the q-axis stator current (torque command) when the slip gain estimate is correctly tuned. As can be seen in the figure, the q-axis and d-axis stator voltages exhibit almost no transients following a step change in the torque command when the slip gain estimate is correctly tuned.

FIGS. 3a–3d show examples of the transient in the stator q-axis and d-axis voltages for a step change in the q-axis stator current (torque command) when the slip gain estimate is incorrectly tuned. Comparing the results shown in FIGS. 2 and 3a–3d, a significant difference in the transient response of the stator voltage commands can be seen. It is this characteristic in the stator voltage transient response that forms the basis for the slip gain estimator of the present invention.

The reason for the difference in the transient behavior of the stator voltage when the slip gain estimate is correctly or incorrectly tuned can be understood by realizing that errors in the slip gain estimate result in the loss of the decoupled control of the torque and rotor flux level in the IFO controller. This cross-coupling between torque and rotor flux level changes, due to errors in the slip gain estimate, can be seen by plotting contours of constant rotor flux, stator current, slip frequency, and torque in the d-axis stator current versus q-axis stator current plane. An example of this plot is shown in FIG. 4.

Figure 4:
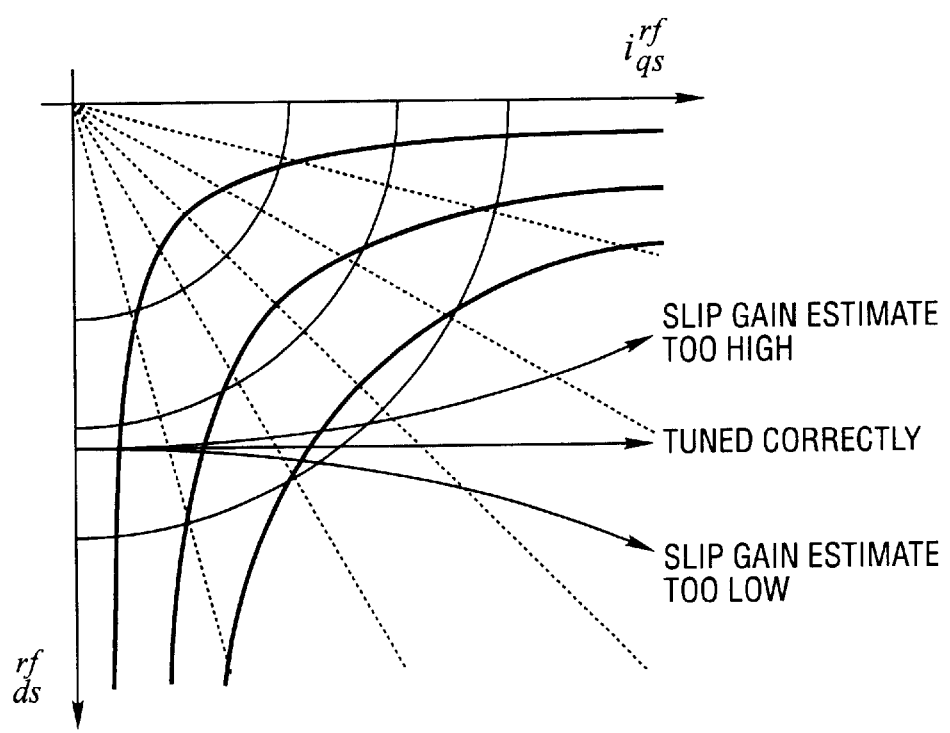
FIG. 4 is a plot in the qd stator current plane showing the effects of slip gain estimate errors on the torque and rotor flux level for changes in the torque command with a constant rotor flux level command.
Figure 5A:
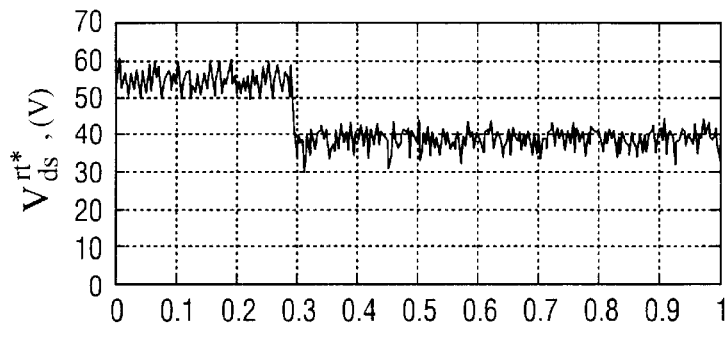
FIGS. 5a–5d show experimentally measured transient responses of the stator voltage command in an indirect field oriented induction machine drive, FIGS. 5a and 5c showing the behavior when the slip gain estimate is correctly tuned, and FIGS. 5b and 5d showing the behavior when the slip gain estimate is 33% low.
Figure 5B:
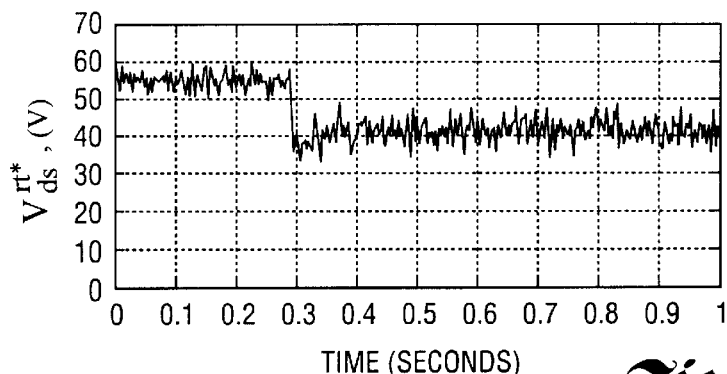
Figure 5C:
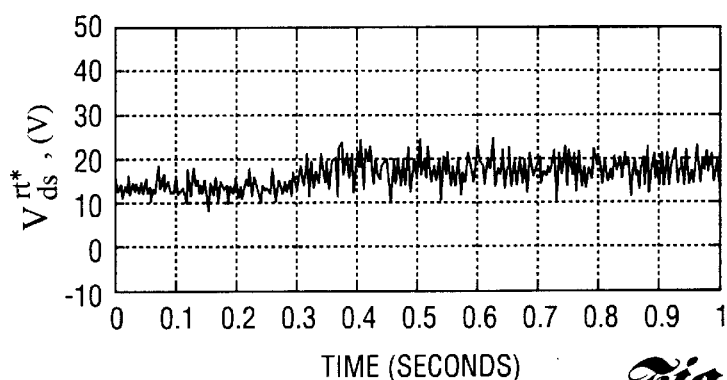
Figure 5D:
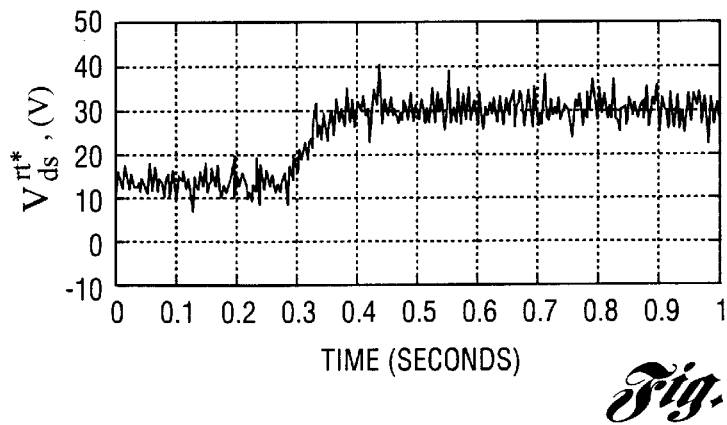

Constant rotor flux contours in FIG. 4 are horizontal lines, constant stator current contours are circles about the origin, constant slip frequency contours are lines emanating from the origin, and constant torque contours are hyperbolas.

From FIG. 4 it can be seen that when the slip gain estimate is too high, increases in the torque command (q-axis stator current command) cause the rotor flux level to decrease even though the rotor flux command remains constant. The opposite of this occurs when the torque command is decreased, with the slip gain estimate too high. Conversely, when the slip gain estimate is too low, increases in the torque command (q-axis stator current command) cause the rotor flux level to increase even though the rotor flux command stays constant. The opposite of this occurs when the torque command is decreased with the slip gain estimate too low. The relatively long rotor time constant (inverse of the slip gain) in most induction machines interact with the changes in rotor flux level, causing rather pronounced transients in the stator voltage whenever the torque command or rotor flux command is changed. In contrast, when the slip gain estimate is correctly tuned, changes in the torque command do not cause changes in the rotor flux level, and there is no significant transient in the stator voltage.

FIGS. 5a–5d show examples of the experimentally measured transient response in the stator voltage command when the slip gain estimate is both correctly and incorrectly tuned. The experimental behavior agrees very closely with the simulation results shown in FIGS. 2 and 3a–3d.

After the transient response to a change in torque command is identified, the slip gain is estimated. The key to this calculation is whether the transient response shows a significant change in the rotor flux level. The relatively slow dynamics for rotor flux level changes makes this possible by collecting the stator voltage or stator voltage command values weighted by a windowing function or wavelet. Examples of potential windowing functions or wavelets are shown in FIGS. 6a–6c.

Figure 6A:
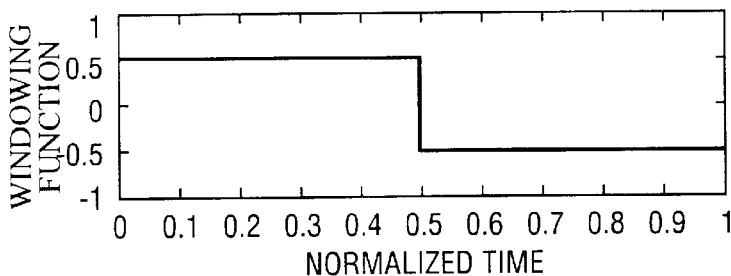
FIGS. 6a, 6b and 6c show windowing functions, FIG. 6a showing the windowing function for a 50% duty cycle square wave, FIG. 6b showing the windowing function for a 25% high duty cycle square wave, and FIG. 6c showing the exponential decay of the windowing function over time.
Figure 6B:
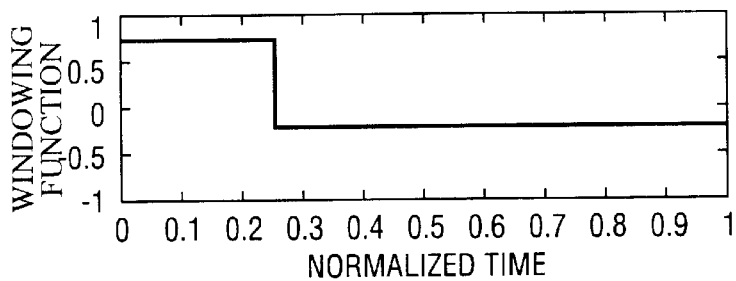
Figure 6C:
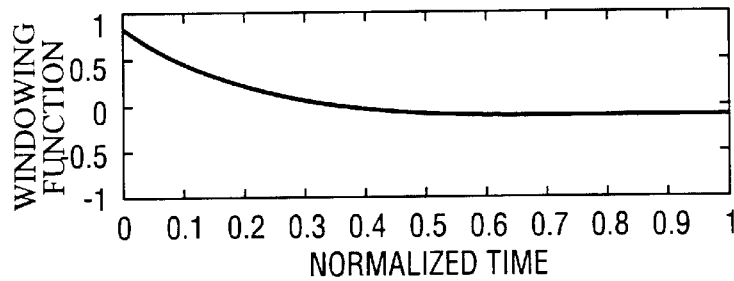

It should be noted that the windowing functions shown in FIGS. 6a–6c are meant as examples and are not meant to be an exhaustive representation of all potential windowing functions. The theory behind the use of the windowing functions, or wavelets, is similar to the theory behind using a Fourier series to represent a periodic waveform. The main difference is that the waveform of interest in this case is a transient waveform, not periodic.

Figure 7A:
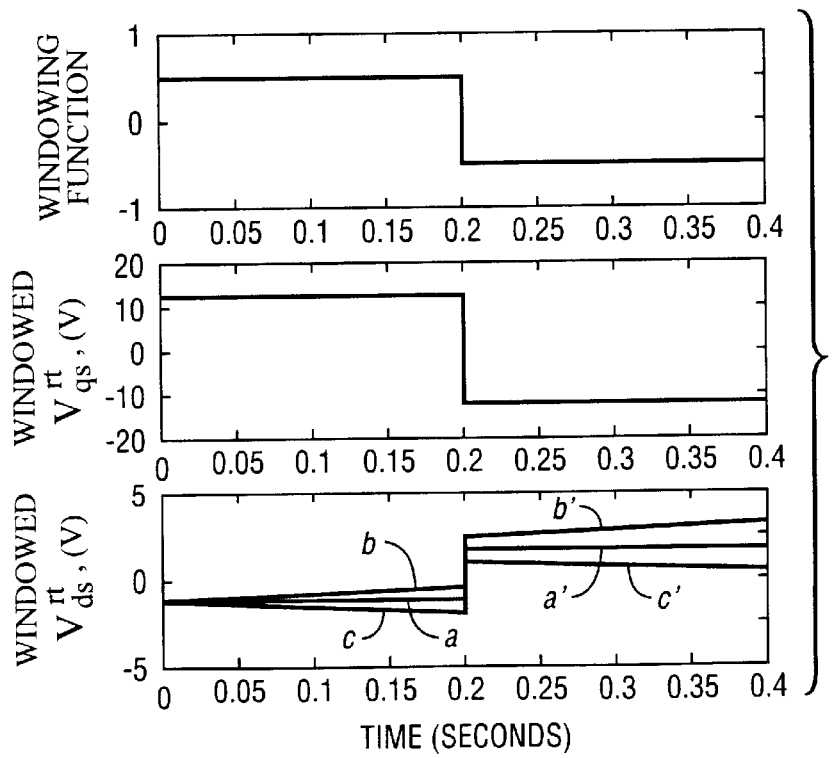
FIGS. 7a and 7b are examples of the windowed stator voltage transient response, FIG. 7a showing a 50% duty cycle square wave window, and FIG. 7b showing a 25% duty cycle square wave window.
Figure 7B:
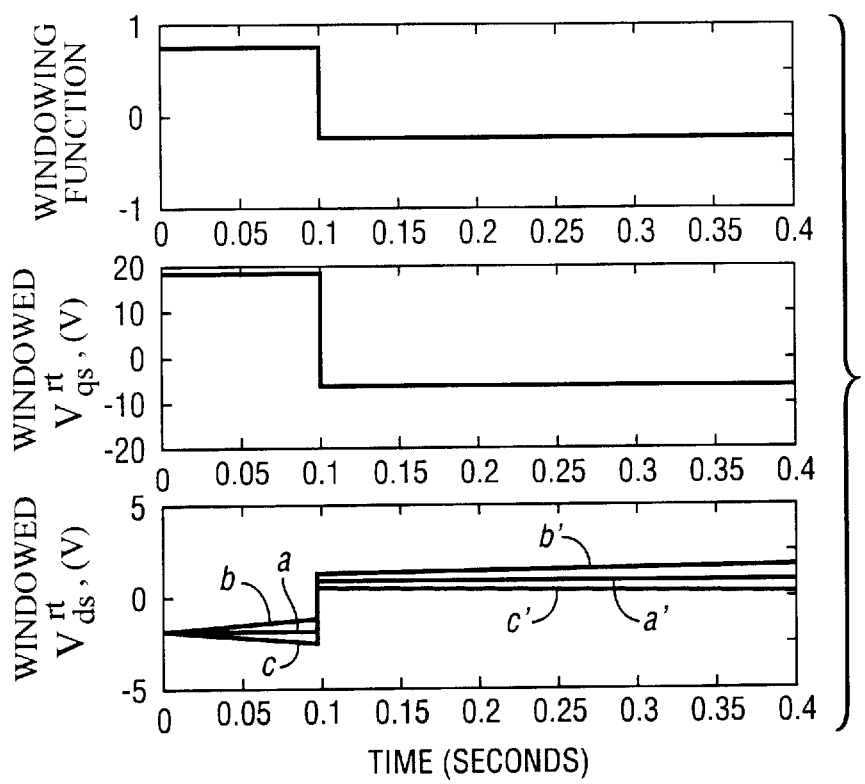

A feature of all of the windowing functions shown in FIGS. 6a–6c is that they all enclose equal areas above and below the x-axis. Defining the windowing functions in this way causes the waveform that results from the multiplication of the windowing function with the stator voltage, after a change in the torque command, to have equal areas above and below the x-axis when the slip gain estimate is correctly tuned. (The stator voltage with the slip gain estimate correctly tuned has a constant magnitude immediately following any change in the torque command when the rotor flux command is held constant. Thus, the waveform that results from the multiplication of this constant times any of the windowing functions has equal areas above and below the x-axis.) Examples of the product of a windowing function and the stator voltage following a change in the torque command are shown in FIGS. 7a and 7b. The figure includes examples of the waveforms that result when the slip gain estimate is higher than the actual value, lower than the actual value, and correctly tuned. A correctly tuned estimate develops a response shown by lines "a" and "a'". When the estimate is higher than the actual, the estimate develops a response shown by lines "b" and "b'". When the estimate is lower than the actual, the estimate develops a response shown by lines "c" and "c'". The waveforms resulting from the multiplication of the windowing function with the stator voltage, when the slip gain estimate is correctly tuned, as explained previously, have equal areas above and below the x-axis.

Figure 8A:
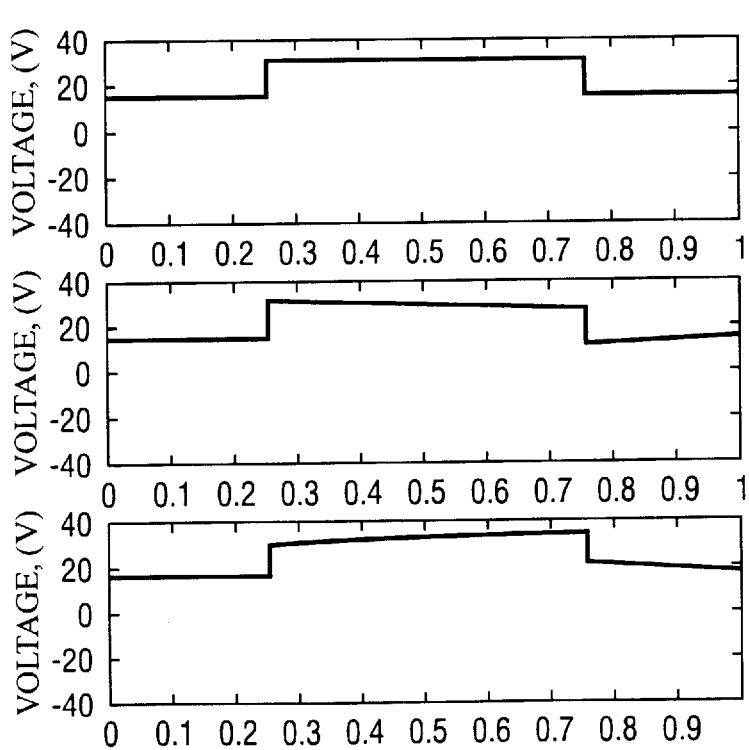
FIG. 8a shows unprocessed voltage waveforms.
Figure 8B:
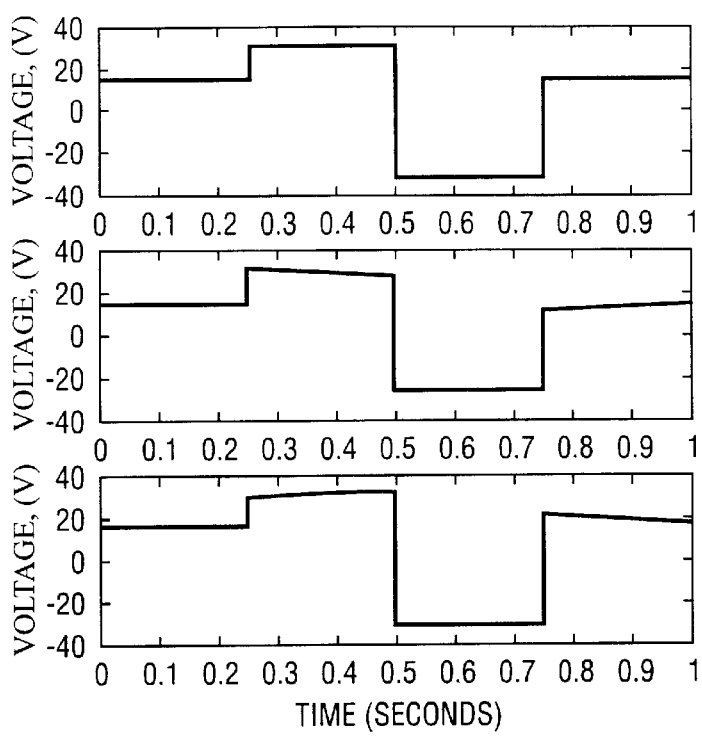
FIG. 8b shows processed windowed voltage waveforms.
Figure 8C:
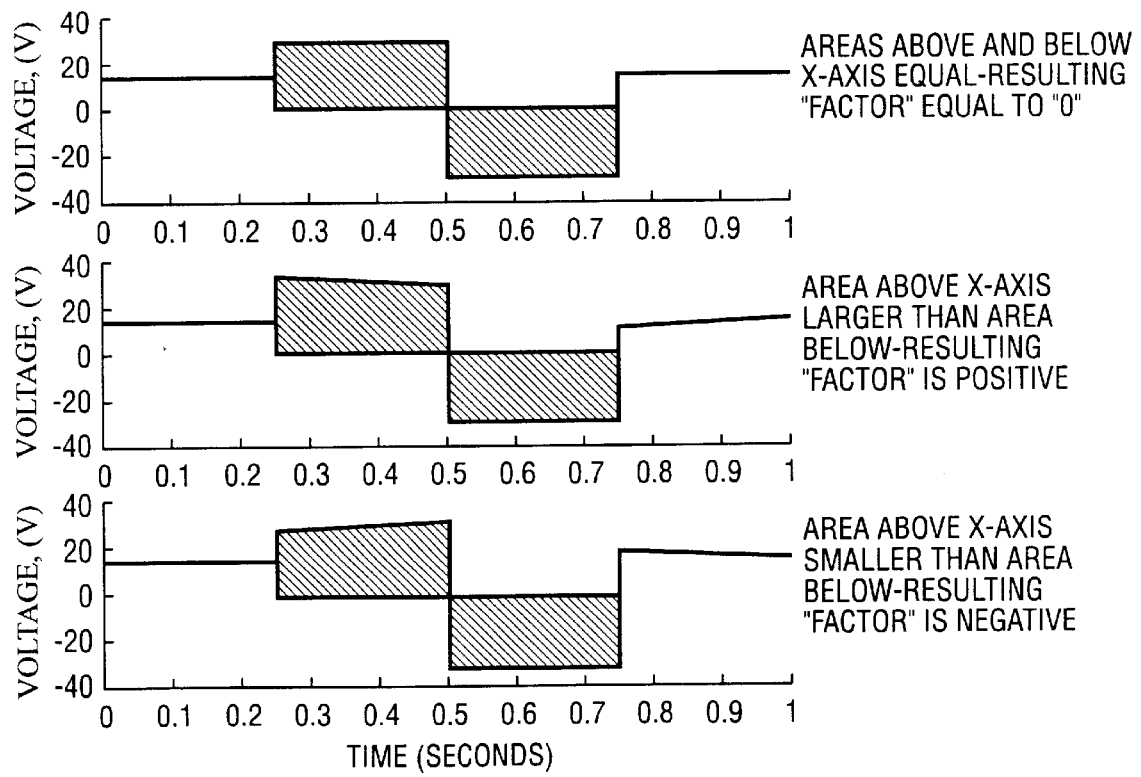
FIG. 8c shows windowed voltage waveforms with areas used in "factor" calculations highlighted.

FIGS. 8a–8c show expanded views of typical transient responses in the stator voltage and the windowed stator voltage. From this figure it can be seen that when the stator voltage does not show a significant transient, as would be the case with the slip gain estimate correctly tuned, the windowed stator voltage transient response has equal areas above and below the x-axis. On the other hand, when the stator voltage does show a transient, i.e., slip gain incorrectly tuned, the windowed stator voltage transient response no longer has equal areas above and below the x-axis. This difference in the areas above and below the x-axis of the windowed stator voltage waveform, when the slip gain estimate is mistuned, will be used to calculate what is termed a "factor". The magnitude and polarity of this "factor" will be in the input that forces the convergence of the slip gain estimation procedure, as explained subsequently.

The length in time of the windowing function, or wavelet, is another parameter that plays an important role in detecting the transient response in the collected data. This duration also determines how long data needs to be collected following any change in the torque command. The key requirement for the duration of the data collection, or length of the windowing function, is that it should not be either too short or too long, so that the transient does not appear significant in the data collected. Since the transient in the stator voltage is governed by the rotor time constant, a rough guideline for the length of time for data collection is that it be in the range of one to five rotor time constants, with significant leeway for either shorter or longer duration time periods. One concern that may be raised with this specification for the time period of the windowing function or data collection is that the rotor time constant, or slip gain, is not known since it is the purpose of the estimation procedure. This is not a significant problem since the time period for the windowing function or data collection does not have to be precise in length relative to the actual rotor time constant. Instead, it just needs to have roughly the same timescale as the rotor time constant, which is easily achieved.

Using the idea of measuring the stator voltage transients, weighted by a windowing function, a procedure can now be outlined for extracting information from the stator voltage transient response on the accuracy of the slip gain estimate following a change in the torque command.

Figure 9:
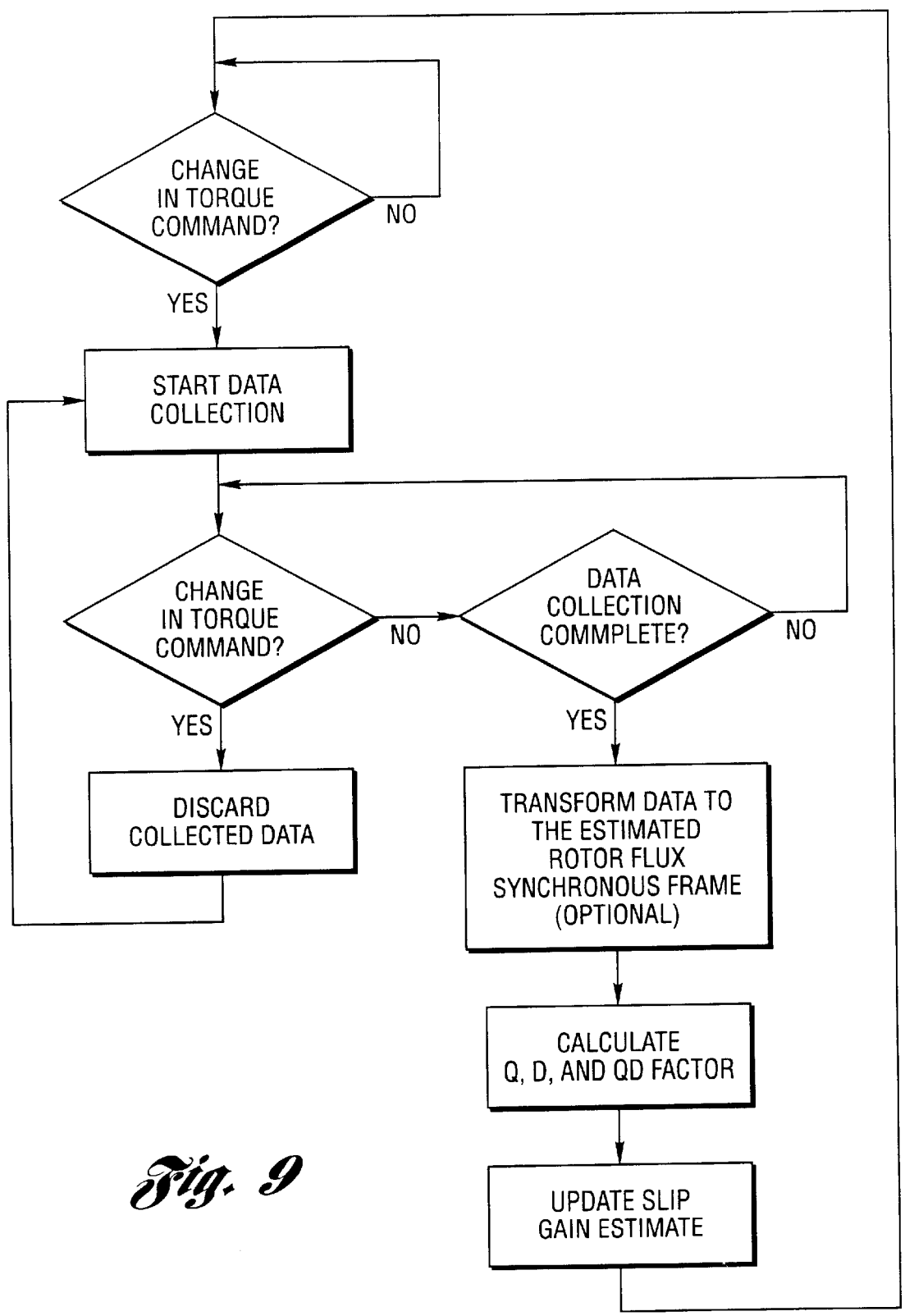
FIG. 9 is a flowchart of the procedure used to analyze transient content of the stator voltage and to correct the slip gain estimate.

The general steps in this procedure are listed below and in the flowchart of FIG. 9.

1) Triggered by a change in the torque command, with the rotor flux command held constant, start collecting either the commanded or measured q-axis and d-axis stator voltages. If another torque command change occurs before finishing collecting data for the first torque command change, discard the data collected and start data collection again from the point of the latest torque command change.

2) If the stator voltage waveforms are not already in this reference frame, transform the stator voltage waveforms to the estimated rotor flux synchronous reference frame (note this step is not required, it just makes the single processing steps simpler and easier to follow).

3) Calculate the product of the collected stator voltage data and the desired windowing function or wavelet.

4) Calculate what are termed the Q and D factors for the current transient event as the time integral of the windowed q-axis and d-axis stator voltage waveforms, respectively. For a discrete time or sampled systems the time integral is just the summation of the windowed data.

5) Using the Q and/or D factor or a combination thereof (QD factor), determine whether the slip gain estimate is correctly tuned. If it is not, initiate the procedure for correcting the estimate based on the calculated Q, D, or QD factor for that transient event.

6) Repeat steps 1 through 4 after each change in the torque command for as long as the estimation procedure is enabled.

The definition for the Q and D factors discussed above are shown in (18) and (19) for a continuous time system, and in (20) and (21) for a discrete time or sampled system; i.e.:

$$Q\_Factor = \int_{t=0}^{t_f} W(t)v_{qs}^{rf} dt \quad (18)$$

$$D\_Factor = \int_{t=0}^{t_f} W(t)v_{ds}^{rf} dt \quad (19)$$

$$Q\_Factor = \sum_{k=1}^{n} W(k)v_{qs}^{rf}(k) \quad (20)$$

$$D\_Factor = \sum_{k=1}^{n} W(k)v_{ds}^{rf}(k), \quad (21)$$

where W(t) or W(k) is the desired windowing function, $t_f$ is the total amount of time that data is collected for, n is the total number of data samples collected, and $V_{qs}^r$ and $V_{qsr}$ are either commanded or measured stator voltages in the estimated rotor flux synchronous reference frame.

Figure 10A:
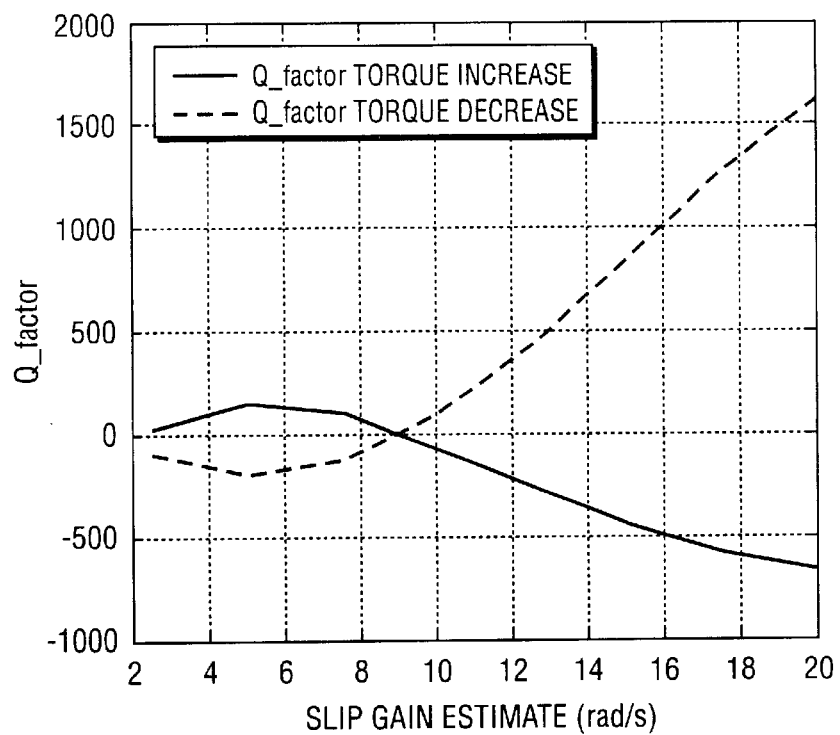
FIGS. 10a and 10b are graphs showing the q-factor and d-factor, respectively, during generating operation.
Figure 10B:
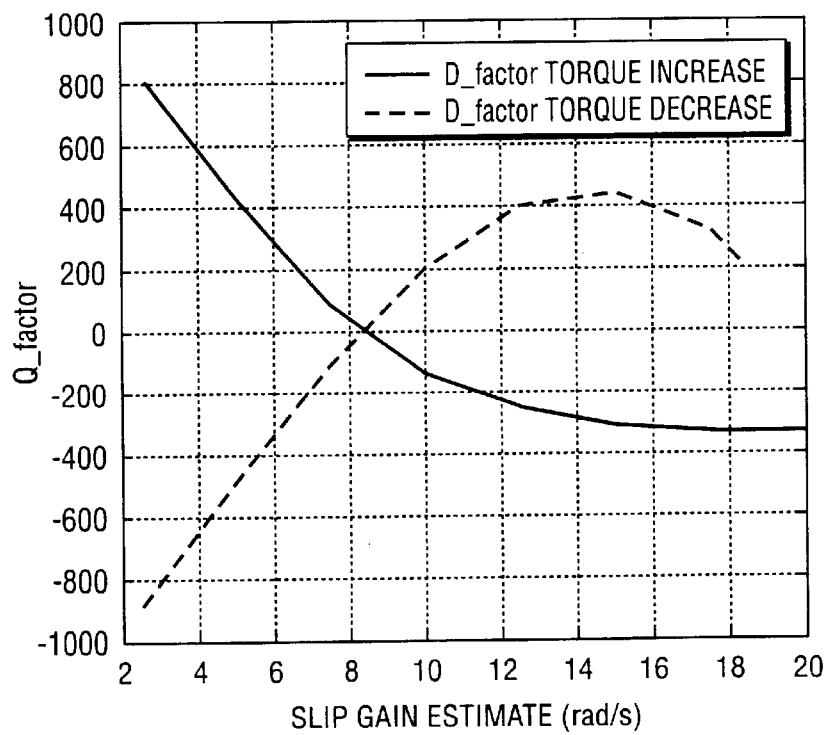
Figure 10C:
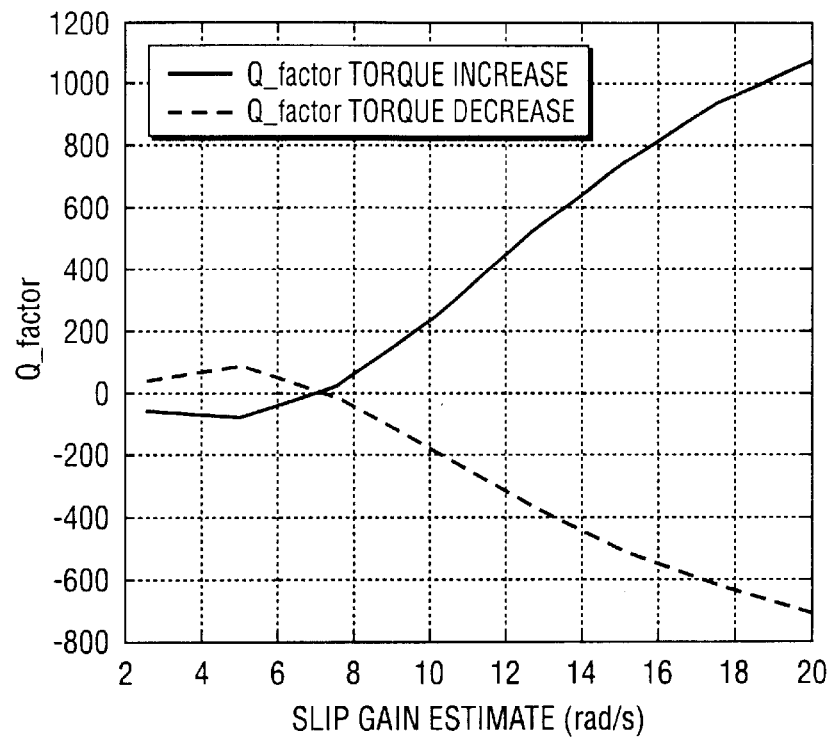
Figure 10B:
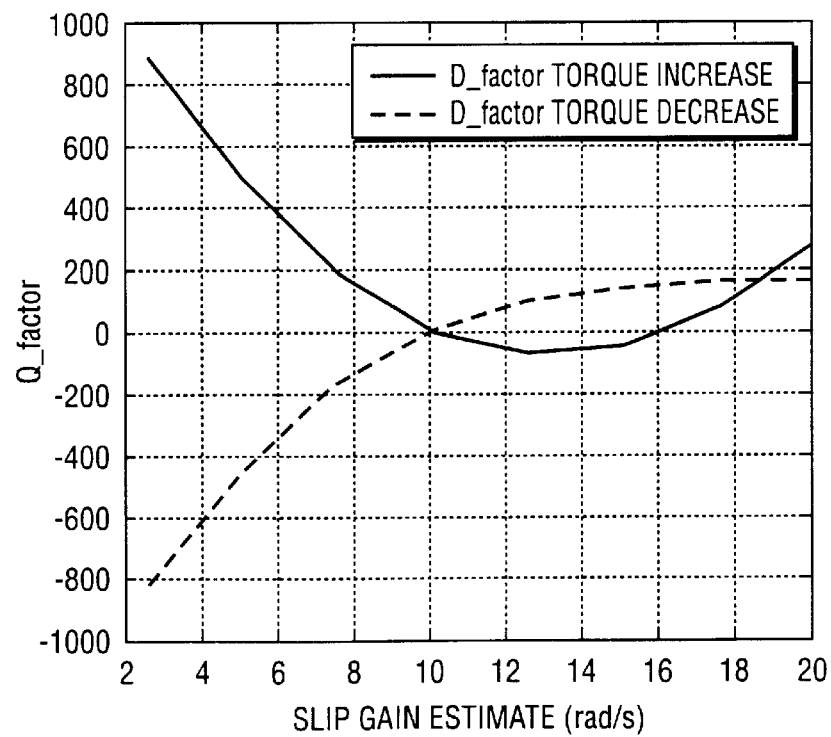

Examples of how the Q and D factor values change as a function of the slip gain estimate are shown in FIGS. 10a and 10b. In the figures, the Q and D factors for motoring operation and generating operation and for increasing and decreasing torque are shown as separate functions of slip gain estimate. The fact that the Q and D factor values depend on how the drive is operated (in motoring mode or generating mode) is because of the fact that each of these different modes affects the rotor flux level in a different way when the slip gain estimate is mistuned. This behavior can also be seen in FIG. 3.

Although the behavior of the Q and D factor shown in FIGS. 10a and 10b show that they are definite and deterministic functions of the slip gain estimate, individually, the Q-factor and the D-factor do not exhibit a behavior that lend themselves to be used as the signal for correcting the slip gain estimate directly. The desired characteristics for such an error signal is that it have no inflection, and preferably a negative slope when plotted as a function of the term being controlled (the slip gain estimate in this case). The limitations in the Q and D factors individually can be solved by using a combination of the two factors, termed the QD factor. The procedure used to calculate this combined QD factor is shown in the following four cases, (22) through (25), and outlined in the flowchart shown in FIG. 11; i.e.:

Case 1: Motoring operation, torque command increasing ($T^*(k)>0$ and $T^*(k)>T^*(k-1)$)

$$QD\_Factor=-Q\_Factor+Factor \quad (22)$$

Case 2: Motoring operation, torque command decreasing ($T^*(k)>=0$ and $T^*(k)<T^*(k-1)$)

$$QD\_Factor=Q\_Factor-D\_Factor \quad (23)$$

Case 3: Generating operation, torque command increasing ($T^*(k)<=0$ and $T^*(k)>T^*(k-1)$)

$$QD\_Factor=Q\_Factor+D\_Factor \quad (24)$$

Case 4: Generating operation, torque command decreasing ($T^*(k)<0$ and $T^*(k)<T^*(k-1)$)

$$QD\_Factor=-Q\_Factor-D\_Factor, \quad (25)$$

where T*(k) represents the torque command level after the change and T*(k−1) is the torque command level before the change.

Figure 11:
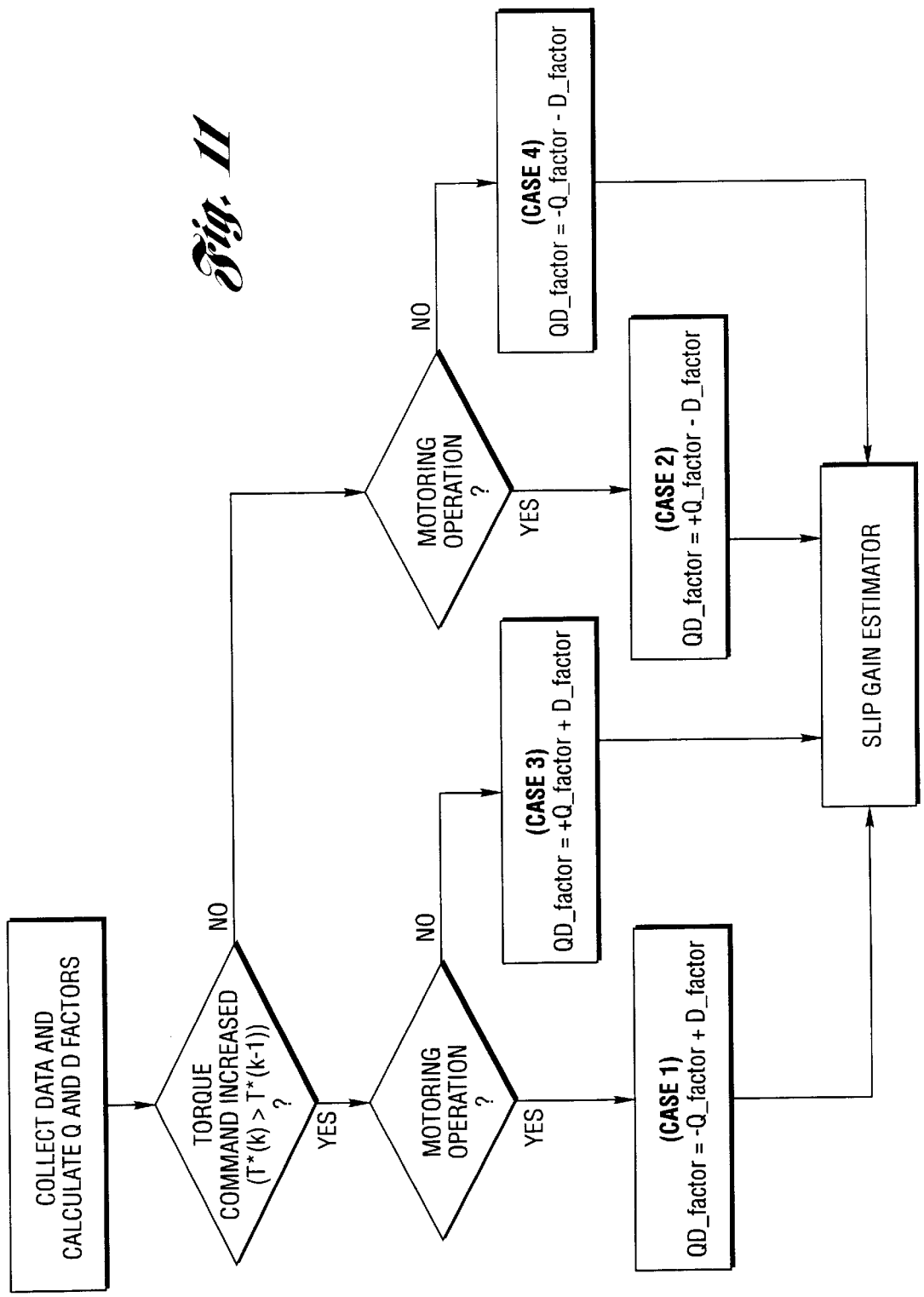
FIG. 11 is a flowchart of the procedure used to calculate the qd-factor.
Figure 12A:
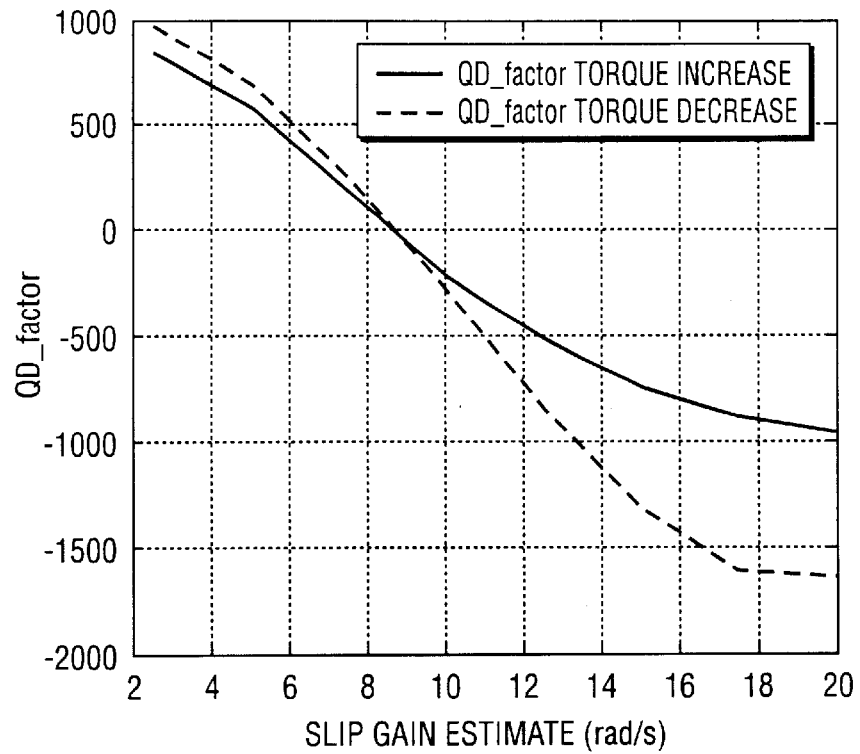
FIGS. 12a and 12b are graphs showing the relationship between the qd-factor and the slip gain estimate during generating operation and motoring operation, respectively.
Figure 12B:
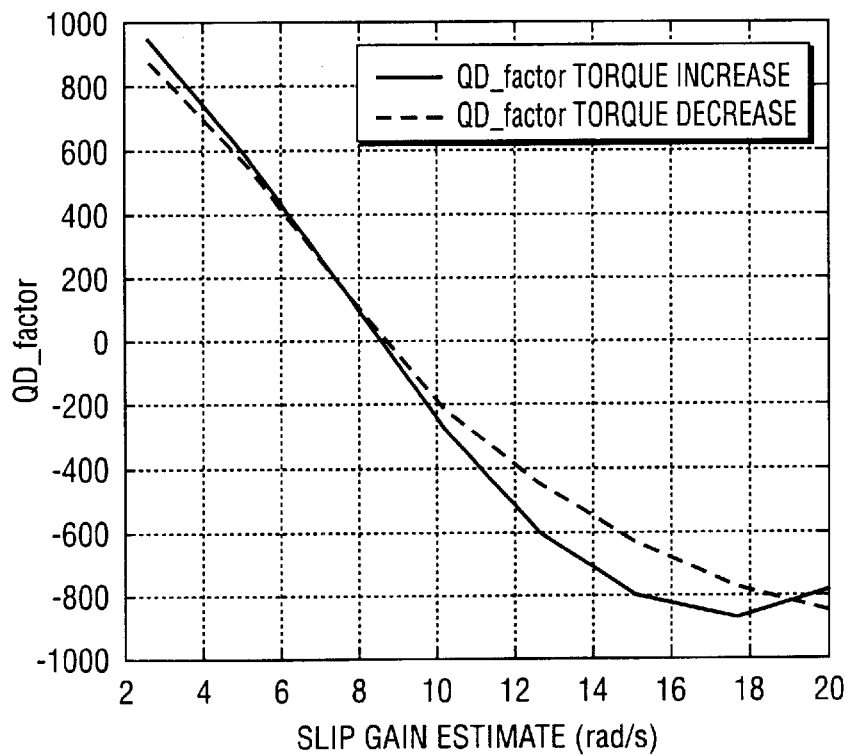

The QD factor that results from the routine of the flowchart shown in FIG. 11 and described by (22) and (25) is shown in FIGS. 12a and 12b. In the figures, the QD factor for motoring and generating operation and for increases and decreases in torque are shown as separate functions of the slip gain estimate. This was done because the QD factor calculated using the four cases outlined in (22) through (25) are not exactly equal, although they are very close. The key feature of the QD factors shown in FIG. 12 is that all of them exhibit a negative slope as a function of the slip gain estimate and for the most part do not have any inflections.

Figure 13A:
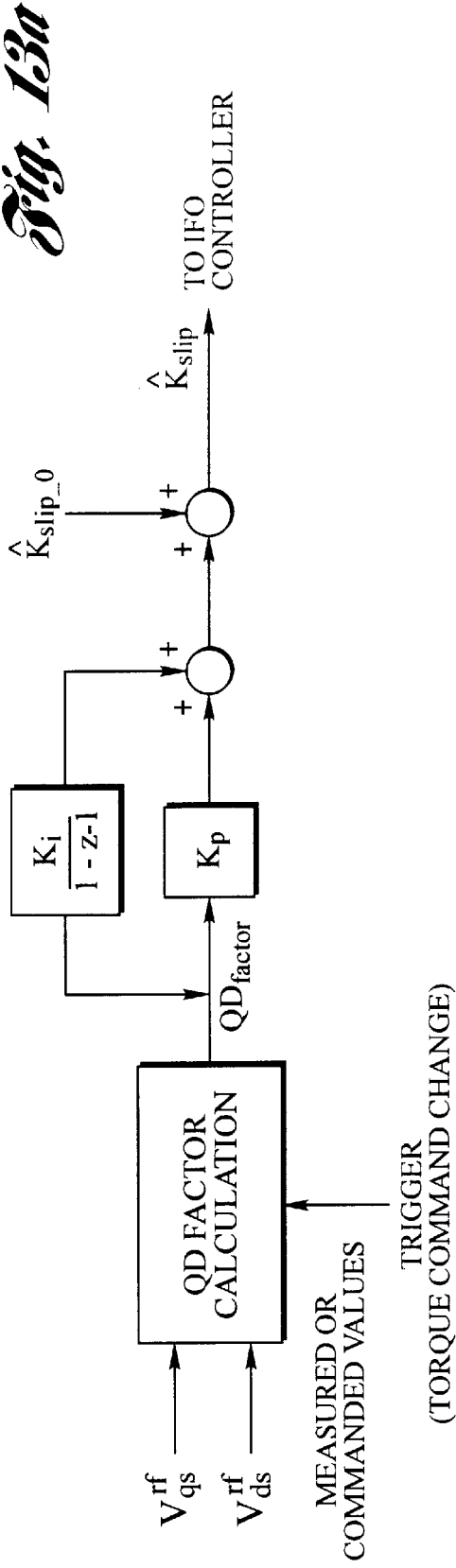
FIGS. 13a and 13b are block diagrams of two different versions of slip gain estimators based on the transient response of stator voltage.
Figure 13B:
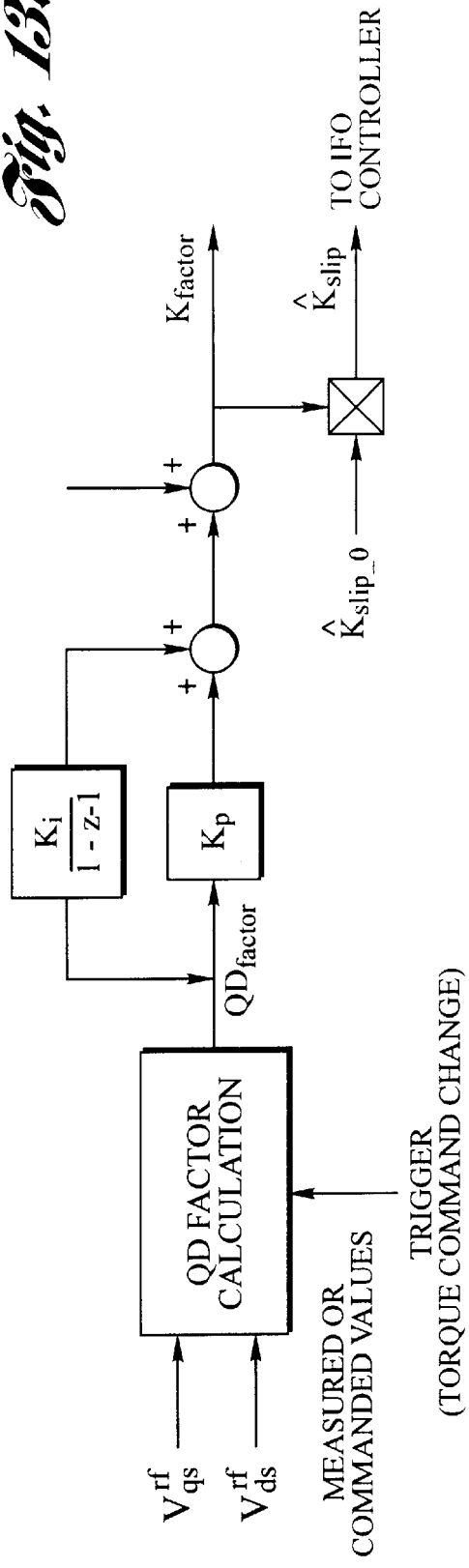

Two examples of how the QD factor can be used to drive the slip gain estimate to converge to the correct value of the slip gain are shown in FIGS. 13a and 13b. In these examples, the QD factor is used to drive a PI controller that produces an updated value for the slip gain estimate after each change in the torque command (with the rotor flux command held constant). One unique aspect of the estimators shown in FIG. 13 is that they only operate and produce an updated slip gain estimate once for each change in the torque command level. Because of this, the sample rate of the systems shown in FIG. 13 is determined by the changes in torque command and is much slower and asynchronous with respect to the faster control functions.

Figure 14A:
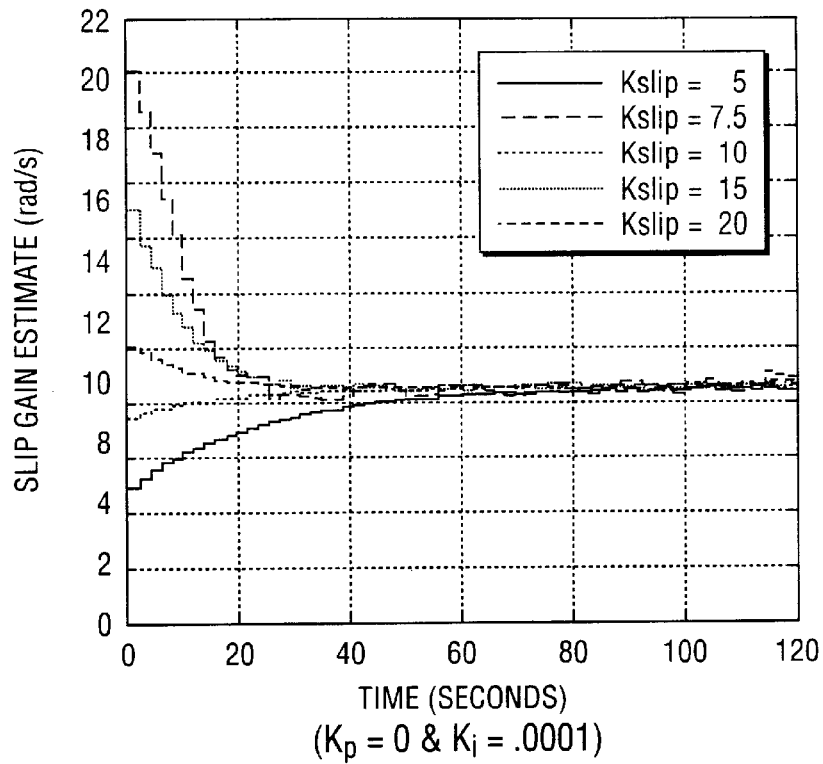
FIGS. 14a–14c are graphs showing experimental data that demonstrate convergence of slip gain estimates to the correct value from various initial incorrect values.
Figure 14B:
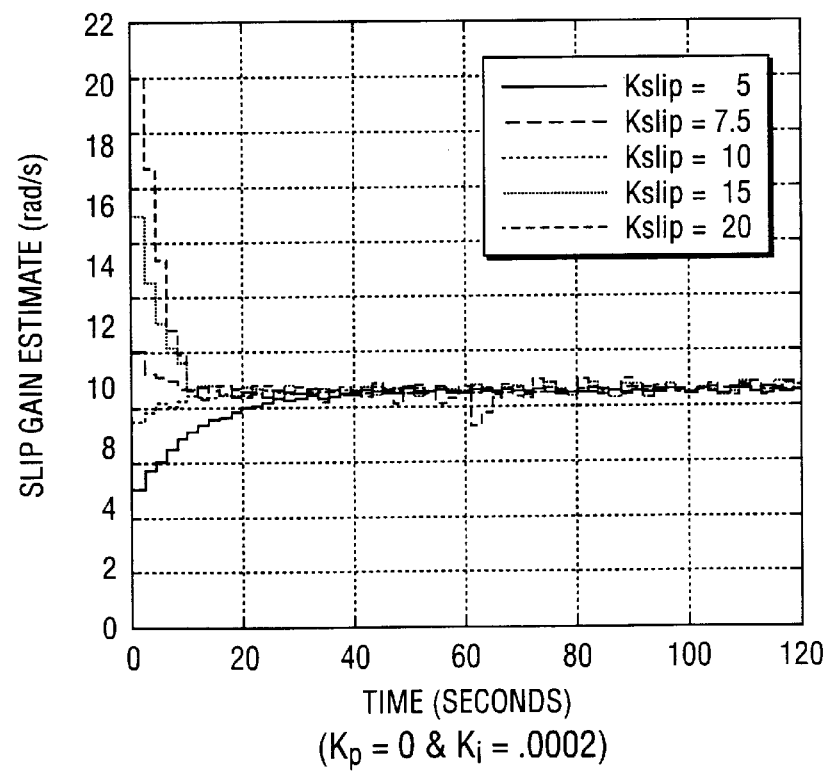
Figure 14C:
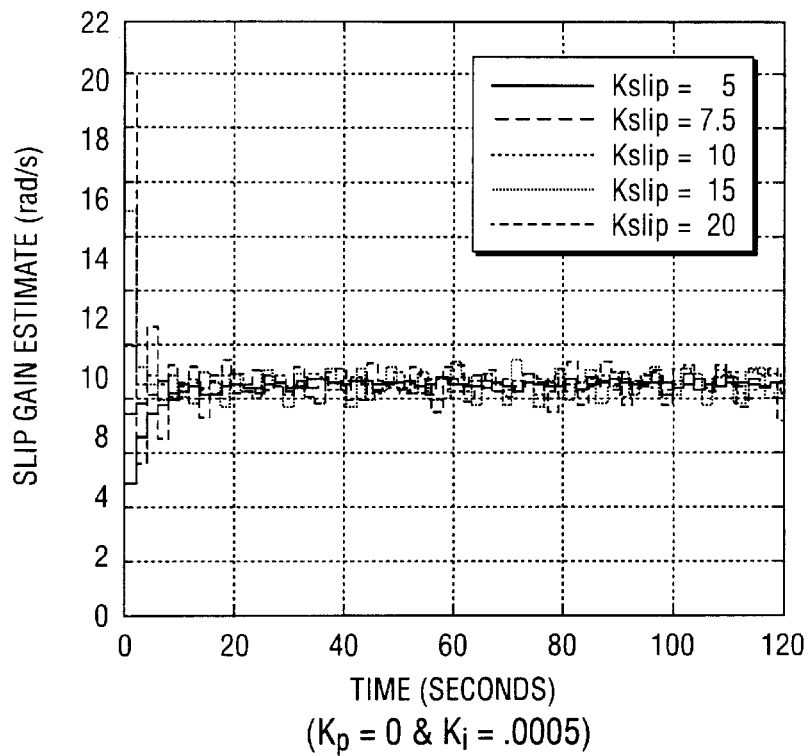

Experimentally collected data showing the convergence of the slip gain estimate from an initial incorrect value to the correct value using the estimator in FIG. 13b are shown in FIGS. 14a–14c. The three cases of estimator controller gains shown in FIGS. 14a–14c show that the rate of convergence of the slip gain estimate can be increased by increasing the gain of the estimator, as expected. Although $K_p$ was set equal to zero for all three cases shown in FIGS. 14a–14c, this is not a requirement. A non-zero $K_p$ value would increase the damping of the estimator and would help reduce oscillations or instabilities in the slip gain estimate. For example, a non-zero value of $K_p$ for the case shown in FIG. 14c might aid in reducing the relatively small oscillations seen in the slip gain estimate after it converges to the correct value.

The results shown in FIGS. 14a–14c also suggest the idea of using variable $K_p$ and $K_i$ gains for the estimator controller based on the magnitude of the QD factor. In a system such as this, the gains would be set to high values when the QD factor is large, resulting in a faster convergence of the slip gain estimate to the correct value. Once the slip gain estimate error becomes small (small QD factor), the gains would be reduced resulting in less sensitivity to noise and greater stability in the slip gain estimate.

Figure 15:
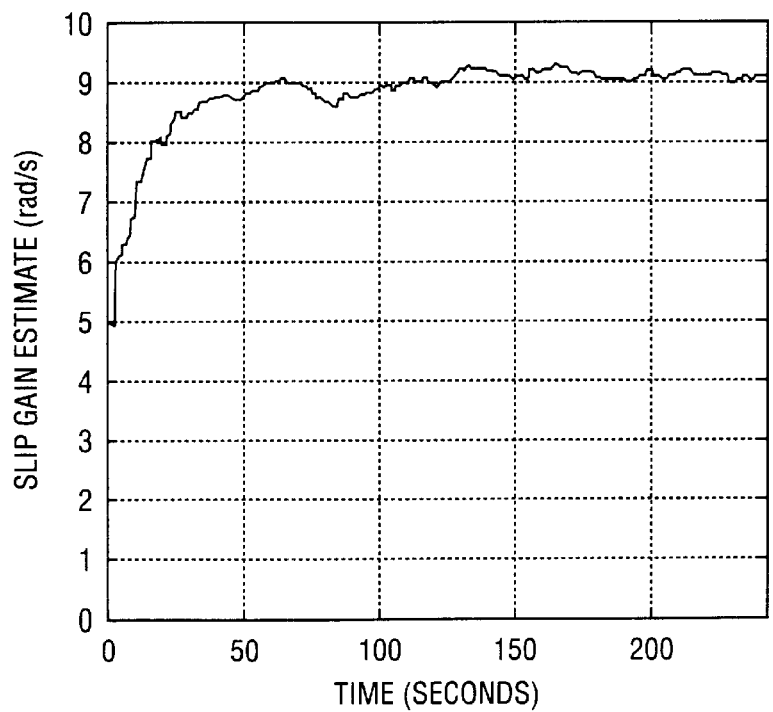
FIG. 15 is a graph showing experimental data demonstrating the convergence of the slip gain estimate to the correct value from an incorrect value, including the effect of rotor temperature increases.

The experimental results shown in FIGS. 14a–14c were for fixed levels of change in the torque command, with the torque command changes occurring at a fixed rate. An example of a slip gain estimator working under what would be considered more normal operation of an induction machine drive is shown in FIG. 15. In this case, the torque command was changed to random levels at a random rate with the machine, and in particular the rotor, at an already elevated temperature. The initial higher and increasing rotor temperature causes the slip gain to increase relative to the results shown in FIGS. 14a–14c. The convergence of the slip gain estimate to the correct value and its tracking of the increasing rotor temperature is evident in the results shown in FIG. 15.

In FIG. 15, $i_{ds}^{rf*}=30A$, $i_{qs}^{rf*}$ varied randomly from 0 to −60A, $K_p=0$, and $K_i=0.002$.

Another method would be to use a previously measured lookup table or curve fit of the Q, D, or QD factor as a function of the slip gain estimate to produce a corrected estimate of the slip gain. An idea related to this would be to make measurements for the Q, D or QD factors over a range of slip gain estimates. The correct value for the slip gain estimate could then be determined by the value that caused one or all of these factors to be zero. The advantage of this slip gain estimation procedure, compared to the estimator shown in FIGS. 13a and 13b, is that a very limited number of test points could be used to perform the tuning at each rotor flux and rotor speed level. Based on the results from these limited test points, a very accurate estimate of the slip gain can be obtained. In the minimum, the QD factor, for example, would need to be measured for only two slip gain estimates. Linear regression or interpolation could then be used to determine the value of the slip gain estimate that results in the QD factor being equal to zero. The accuracy of this simple interpolation procedure between two test points can be seen by looking at FIGS. 12a and 12b, which show examples of the experimentally measured variation in the QD factor as a function of the slip gain estimate. Of particular interest is the linearity of the various QD factor curves, especially near the intersection of the curves with the x-axis (the tuning of the slip gain estimate is correct at that point), and the close agreement among the various curves on the slip gain estimate at which this occurs. Similar relationships to this also exist for the Q and D factors.

Although an embodiment of the invention has been disclosed, modifications may be made by a person skilled in the art without departing from the scope of the invention. All such modifications and equivalents thereof are intended to be covered by the following claims.

What is claimed:

1. A method for estimating slip gain of an induction machine system with a rotor and a fixed stator that form a torque flow path from a torque input member to a torque output member, the method comprising:
   commanding a change in torque on the torque input member;
   determining commanded q-axis and d-axis stator voltages;
   calculating the product of the stator voltage and a desired windowing function, the windowing function being a multiplier for stator voltage following a change in torque command to effect a correctly tuned slip gain estimate;
   calculating Q and D factors for a current transient event as a time integral of a windowed q and d axis stator voltage waveform;
   determining, using Q and D factors, whether an estimate of slip gain is accurate; and
   correcting the slip gain estimate for a given change in commanded torque based on the Q and D factors relative to a slip gain estimate that is correctly tuned.

2. The method for estimating slip gain as set forth in claim 1, wherein the Q factor and the D factor are expressed, respectively, as:

$$Q\_Factor = \int_{t=0}^{t_f} W(t)v_{qs}^{rf}dt$$

$$D\_Factor = \int_{t=0}^{t_f} W(t)v_{ds}^{rf}dt$$

where W is the windowing factor, rf is the rotor flux reference frame, qs is the q-axis, ds is the d-axis, and $t_f$ is the total amount of time for data collection and $v_{qs}^{rf}$ and $v_{ds}^{rf}$ are the stator voltages in the estimated rotor flux synchronous reference frame.

3. The method set forth in claim 2, wherein the induction machine acts as a motor as torque is distributed through the torque flow path from the input member to the output member and as a generator as torque is distributed through the torque flow path from the output member to the input member;
   the Q factor and the D factor relationship to slip gain estimates uniformly changing as slip gain estimates increase during both motoring operation and generating operation as torque command changes.

4. The method as set forth in claim 1, wherein the induction machine acts as a motor as torque is distributed through the torque flow path from the input member to the output member and as a generator as torque is distributed through the torque flow path from the output member to the input member;
   the Q factor and the D factor relationship to slip gain estimates uniformly changing as slip gain estimates increase during both motoring operation and generating operation as torque command changes.

5. A control system for controlling torque in a torque transfer drive having a torque input member and a torque output member, the system including a programmable digital processor having a memory in which control algorithms are stored and a central processor unit for executing control processing steps in accordance with control algorithm instructions, the steps comprising:
   commanding a change in torque on the torque input member;
   determining commanded q-axis and d-axis stator voltage;
   calculating the product of the collected stator voltage and a desired windowing function, the windowing function being a multiplier for stator voltage following a change in torque command to effect a correctly tuned slip gain estimate;
   calculating Q and D factors for a current transient event as a time integral of a windowed q and d axis stator voltage waveform;
   determining, using Q and D factors, whether an estimate of slip gain is accurate; and correcting the slip gain estimate based on the Q and D factors for a given change in commanded torque relative to a slip gain estimate that is correctly tuned.

6. The control system as set forth in claim 5, wherein the Q factor and the D factor are expressed, respectively, as:

$$Q\_Factor = \int_{t=0}^{t_f} W(t)v_{qs}^{rf} dt$$

$$D\_Factor = \int_{t=0}^{t_f} W(t)v_{ds}^{rf} dt$$

where W is the windowing factor, rf is the rotor flux reference frame, qs is the q-axis, ds is the d-axis, and $t_f$ is the total amount of time for data collection and $v_{qs}^{rf}$ and $v_{ds}^{rf}$ are the stator voltages in the estimated rotor flux synchronous reference frame.

7. A system for controlling torque in a driveline having a multi-phase induction machine, the induction machine having a rotor and a fixed stator that form a torque flow path from a torque input member to a torque output member, the system having a digital processor with a memory containing an algorithm that responds to rotor position and speed data to achieve a torque control that includes the steps of:

establishing a commanded torque change input in the form of a commanded stator current in a rotor flux reference frame;

determining the stator current in the rotor flux frame;

determining the difference in the stator currents in the rotor flux frame;

computing a stator voltage in the rotor flux reference frame that depends on the current difference;

determining slip frequency and a first rotor flux angle corresponding to commanded torque as a function of estimated slip gain;

measuring rotor angle;

determining an estimated rotor flux angle based on the summation of the first rotor flux angle and the rotor angle;

the stator current in the rotor flux reference frame being determined as a function of estimated rotor flux angle and current in a stationary reference frame for the induction machine.

8. The system set forth in claim 7 including a reference frame transformer that responds to estimated rotor flux position change and measured current in the stationary reference frame to determine the stator current in the rotor flux reference frame.

9. The system set forth in claim 8 including a phase transformer for converting three-phase stator current to two-phase stator current in the stationary reference frame.

10. The system set forth in claim 7 including a phase transformer for converting three-phase stator current to two-phase stator current in the stationary reference frame.

* * * * *